US009827488B2

(12) United States Patent
Pearce

(10) Patent No.: US 9,827,488 B2
(45) Date of Patent: Nov. 28, 2017

(54) SYSTEM AND METHOD FOR IDENTIFYING COMPATIBLE USERS

(71) Applicant: SONY INTERACTIVE ENTERTAINMENT AMERICA LLC, San Mateo, CA (US)

(72) Inventor: Nathan Pearce, San Diego, CA (US)

(73) Assignee: SONY INTERACTIVE ENTERTAINMENT AMERICA LLC, San Mateo, CA (US)

(*) Notice: Subject to any disclaimer, the term of this patent is extended or adjusted under 35 U.S.C. 154(b) by 253 days.

(21) Appl. No.: 14/449,382

(22) Filed: Aug. 1, 2014

(65) Prior Publication Data
US 2014/0342836 A1 Nov. 20, 2014

Related U.S. Application Data

(63) Continuation of application No. 12/204,762, filed on Sep. 4, 2008, now Pat. No. 8,825,802.
(Continued)

(51) Int. Cl.
A63F 13/795 (2014.01)
A63F 13/30 (2014.01)
G07F 17/32 (2006.01)

(52) U.S. Cl.
CPC .............. A63F 13/12 (2013.01); G07F 17/32 (2013.01); G07F 17/3237 (2013.01); G07F 17/3274 (2013.01)

(58) Field of Classification Search
CPC ....... A63F 13/12; G07F 17/32; G07F 17/3237
(Continued)

(56) References Cited

U.S. PATENT DOCUMENTS 6,480,885 B1 11/2002 Olivier
8,825,802 B2 9/2014 Pearce
(Continued)

FOREIGN PATENT DOCUMENTS

EP 1570887 9/2005
WO WO 2004/046859 6/2004
WO WO 2006/124811 11/2006

OTHER PUBLICATIONS

U.S. Appl. No. 12/204,762; Final Office Action dated Apr. 2, 2013.
(Continued)

Primary Examiner — David L Lewis
Assistant Examiner — Ross Williams
(74) Attorney, Agent, or Firm — Polsinelli LLP

(57) ABSTRACT

Systems and methods are provided for an automatic user or friend recommendation system that matches players that have compatible play styles, play schedules, or the like. Behavioral data is collected or entered from players, and a profile of each player is created and compared to calculate a compatibility score. If the compatibility score exceeds a predetermined threshold, then the players are marked as compatible, or a degree of compatibility may be calculated and displayed as well. Users can edit their profile, e.g., on a web application or in-game. Users may also interact with optional and incremental demographic survey questions as they log in. A notification of compatible players may be provided via the web application or via an in-game indication. For example, a glow may appear around a compatible player, or compatible players may be displayed in a list, such as an instant messaging client.

20 Claims, 18 Drawing Sheets

Related U.S. Application Data

(60) Provisional application No. 60/967,524, filed on Sep. 4, 2007.

(58) Field of Classification Search
USPC .................................................. 463/40–42
See application file for complete search history.

(56) References Cited

U.S. PATENT DOCUMENTS

| | | |
|---|---|---|
| 2005/0192097 A1 | 9/2005 | Farnham et al. |
| 2006/0121990 A1 | 6/2006 | O'Kelley et al. |
| 2006/0135264 A1 | 6/2006 | Shaw et al. |
| 2006/0242291 A1 | 10/2006 | Nevalainen |
| 2006/0287096 A1 | 12/2006 | O'Kelley et al. |
| 2008/0222535 A1 | 9/2008 | Zrike et al. |
| 2008/0242420 A1 | 10/2008 | Graepel et al. |

OTHER PUBLICATIONS

U.S. Appl. No. 12/204,762; Office Action dated Nov. 14, 2012.
U.S. Appl. No. 12/204,762; Final Office Action dated Feb. 14, 2012
U.S. Appl. No. 12/204,762; Office Action dated Aug. 31, 2011.

I have played these MMO's:

☐ Anarchy Online
☑ Asheron's Call — pretty good ⌄
☐ Asheron's Call 2
☐ Dark Age of Camelot
☐ EverQuest
☑ EverQuest II — I found this game to be ... ⌄
☐ EverQuest Online Adventures — A lot of fun!
☐ Final Fantasy XI — pretty good
☐ etc. — not so great
         just terrible!

Other Gaming Genres I enjoy:

☐ FPS (first-person shooter)
☐ RTS (real-time strategy)
☐ RPG (non-persistent world role-playing games)
☐ Racing
☐ Fighting
☐ etc.

FIG. 9

Add to your Station Matchmaking Profile
*optional

My play style is mainly... ▼   174
Explorer
Achiever
Socializer
Killer

Station Username
oriion2   176

Station Password
*******   178

[Forgot Password]

Login

☐ station.com

⊙ » oriion2

Station Sign In

Add to Your Station Matchmaking Profile

182 — When I play MMO's, I like to... ⌄
Always play solo
Usually play solo
About half & half
Usually play in a group
Always play in a group Current Station Members
please sign in to continue.

Station Name: [oriion] — 176
Password: [******] — 178

Save your password ☑

[Submit]  [Cancel]

Forgotten your
Station Name?
Click Here.

Forgotten your
Password?
Click Here.

SYSTEM AND METHOD FOR IDENTIFYING COMPATIBLE USERS

CROSS-REFERENCE TO RELATED APPLICATIONS

The present application is a continuation and claims the priority benefit of U.S. patent application Ser. No. 12/204,762 filed Sep. 4, 2008, which claims the priority benefit of U.S. provisional application 60/967,524 filed Sep. 4, 2007, the disclosures of which are incorporated herein by reference.

BACKGROUND OF THE INVENTION

Field of the Invention

Video games, especially online multiplayer games, enjoy a significant and increasing popularity. These games typically have multiple functionality for users to enjoy social involvement, such as chat channels of numerous types, guild memberships, grouping opportunities, and the like. However, in many cases, and despite typically being surrounded in-game by numerous players, it is still difficult for a given user to meet and enjoy the game with other users, especially ones that play at the same time and in the same way.

SUMMARY OF THE PRESENTLY CLAIMED INVENTION

Systems and methods are provided for an automatic user or friend recommendation system that serves as an introduction service between players that are determined to have compatible play styles, play schedules, or the like. For any given user, here termed a 'subject' user, attention is called to other players who may share a high degree of gameplay compatibility.

Behavioral data is collected, entered, or requested from players, and a profile of each player is created from the data. Profiles are compared to calculate a compatibility score. For example, players that play the same game, on the same server, at a similar level, and at the same time, would achieve a high score. Differences in these or other values would result in a lower score. If the compatibility score is greater than or equal to a predetermined threshold, then the players are marked or flagged as compatible. Rather than just a binary outcome, a degree of compatibility may be calculated and displayed as well.

Users can add to and manage their profile, either by viewing and modifying their profile on a web application (and/or in-game, e.g., if the compatibility determination is game-specific). Users may also interact with optional and incremental demographic survey questions as they log in.

A notification may be provided via the web application or via an in-game indication. For example, a glow may appear around a compatible player, or compatible players may be displayed in a list, such as on an instant messaging client. A subject user may discover more about the compatible player using the system, so as to see details about common interests, and may invite the other player to a group or to join their friends list. Besides appearing on automatically-generated lists, a subject user may perform a search for compatible users using their own criteria or using default criteria.

Additional aspects of the invention are now noted.

In one aspect, the invention is directed towards a computer-readable medium containing instructions which, when executed by one or more processors disposed in a computing device, perform a method of providing a subject user with notifications about compatible users on a network. The method includes the steps of: receiving information about users on a network, and creating a profile for each user based on the received information; comparing the created profile of a subject user with the created profiles of other users on the network and calculating a compatibility score for each set of compared profiles; and if the compatibility score between the subject user profile and another user profile is greater than a predetermined threshold, then flagging the other user profile as a compatible user relative to the subject user.

Implementations of the invention may include one or more of the following. The network may be a network of players of online multiplayer games, and may be disposed on a single game server. The medium may further run on a game console, wherein at least one of the network of players accesses the network using the game console. The method may further comprise, prior to the creating step for a given user, receiving an opt-in indication or not receiving an opt-out indication for the given user on the network. The method may further comprise receiving an indication from the subject user that one or more of the users with flagged profiles is to be invited to join a friends list of the subject user. The method may further comprise receiving an indication from the subject user that one or more of the users with flagged profiles is to be invited to join a group with the subject user. The calculating a compatibility score may include determining whether the subject user and the other users are within the same LAN or within the same geographic locale. The network may be a network of players of online multiplayer games, and if the determination is made that the subject user and another user are within the same LAN or within the same geographic locale, then the method further includes transmitting a notifier to the subject user about the other user, where the notifier is a text message, an instant message, an in-game notification, an indicator placed on a map at a location corresponding to a player character associated with the flagged other user, an indicator rendered on or near a player character associated with the flagged other user, a notifier on a list rendered on a user interface of the game or on a web application, a notifier on an instant message group listing, or an email. The method may further include sending a signal to a computing device of the subject user, the signal causing the computing device of the subject user to render an indication of the flagged other user profile. The causing step may include causing the computing device of the subject user to render an indication of a degree of compatibility between the subject user profile and the flagged other user profile, the degree of compatibility in proportion to the calculated compatibility score. The network may be a network of players of online multiplayer games, and the indication may be an instant message, an in-game notification, an indicator placed on a map at a location corresponding to a player character associated with the flagged other user, an indicator rendered on or near a player character associated with the flagged other user, a list rendered on a user interface of the game or on a web application, or an instant message group listing. The method may further comprise receiving an indication from the subject user that one or more of the users with flagged profiles is to be invited to enter a chat channel with the subject user. The step of receiving information may include collecting data about a user's network usage or stored demographic data. The step of receiving information may also include the step of receiving data entered by a user, and the receiving data entered by a user may include, upon the user login to the network, rendering a question to a user and receiving a response to the question. The method may further include: receiving a search query from a user; conducting a search of the created profiles based on the search query; and returning an indication of the stored user profiles that match the search query. The step of calculating may include: determining an overlap in play schedules, determining an overlap in play styles, determining an overlap in language spoken, or determining an overlap in games owned.

In another aspect, the invention is directed towards a method of finding compatible players in an online multiplayer game. Steps of the method include comparing data stored about the players to determine which pairs of players have a compatibility score meeting or exceeding a predetermined threshold; for any given player, marking as compatible each other player for which the compatibility score between the given player and the other player meet or exceed the predetermined threshold; and for any given player, communicating information about which other players have been marked as compatible. In a further aspect, the invention is directed towards a computer-readable medium comprising instructions for causing a computing device to implement this method.

In yet another aspect, the invention is directed towards a system for providing a subject user with notifications about compatible users on a network. The system includes a collection and reception module, for collecting or receiving data about users on a network; a profile creation module, for creating a profile for each of at least two users on the network; a comparison and calculation module, for comparing sets of profiles to determine a compatibility score between a set of two profiles; a marking and flagging module, for marking or flagging sets of profiles for which the determined compatibility score is greater than a predetermined threshold; and a notification module, for notifying one or both of the users associated with each marked or flagged set of profiles.

Advantages of the invention may include one or more of the following. The system and method may automatically collect or receive information about a user to build a profile of the user, and may determine compatibility of two users by comparing their profiles. The system and method may recommend matches based on compatibility, and may facilitate communication between users, e.g., by use of an invitation interface.

Additional advantages will be apparent from the description that follows, including the figures and claims.

This Summary is provided to indicate certain aspects of the invention in a summarized form. Elements or steps other than those described here are possible, and none are necessarily required. This Summary is not intended to be used to determine the scope of the claimed subject matter. For example, while invitations are described, they need not be an invitation to a group or to a friend's list; invitations may be provided for other purposes as appropriate.

BRIEF DESCRIPTION OF THE DRAWINGS

FIG. 9 illustrates a series of check boxes and drop-down menus by which a user may enter data corresponding to their play style or behavior. Besides those shown in the figure, numerous other data may be requested.

FIG. 10 illustrates an exemplary login screen for an online game, in which a question is posed; by answering the question, the subject players provides additional information which may then be employed to further refine the calculation of which players are deemed compatible with the subject player.

FIG. 11 illustrates an exemplary login screen for a web application or tool in which a question is posed for the same reason as in FIG. 10.

FIG. 13 illustrates a user interface displaying three lists of users along with games played by the users, the lists ranked in order of compatibility to a subject user. At the top are currently-marked compatible users or users already on a friends list. In the middle are online users who are potential friends of the subject user, meaning that they have a compatibility score, relative to the subject user, that meets or exceeds a predetermined threshold. At the bottom a list is given of friends of friends, the same potentially being appropriate for the subject user to become friends with.

Options are provided for sending or requesting demo versions of the games not owned by both users, as well as to invite the other player to play a game together.

Figure 17:
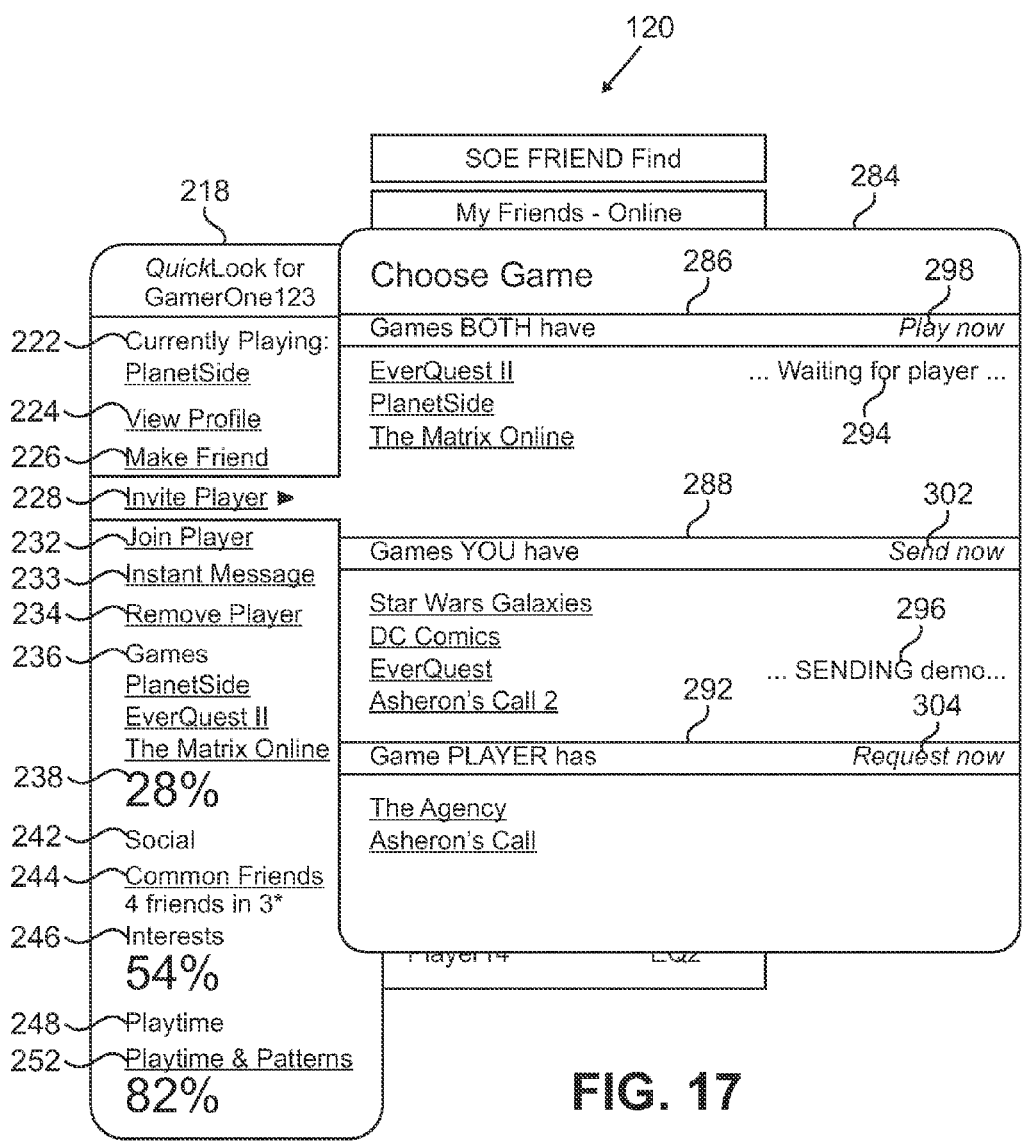
FIG. 17 illustrates an exemplary result of the subject user mousing over the "invite player" entry in the submenu of FIG. 14. In particular, a sub-submenu is displayed including various details of which games are owned by one and/or both of the subject user and the potentially-invited player.
Figure 18:
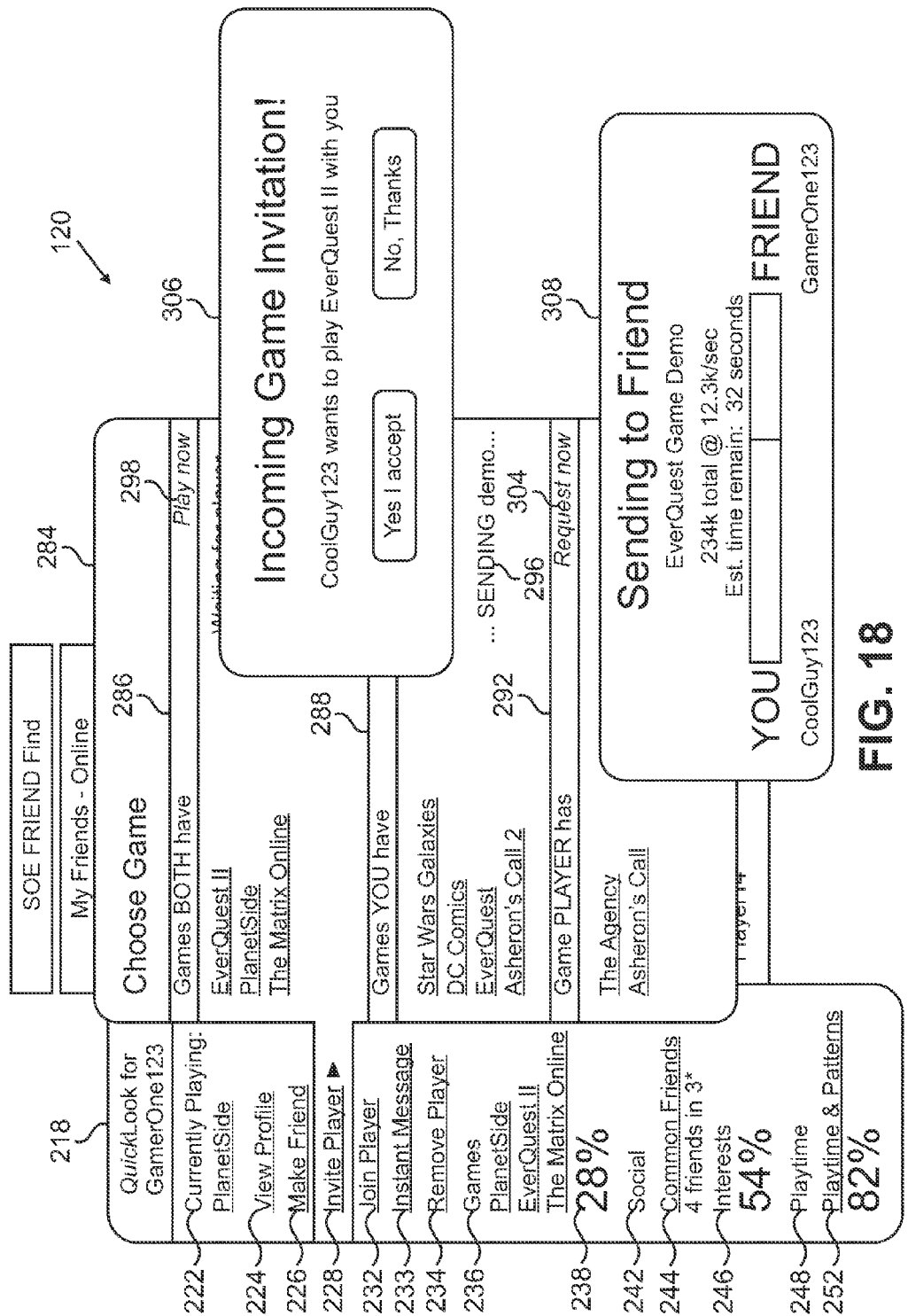

FIG. 18 illustrates an exemplary depiction of the subject user inviting a player to play a commonly-owned game using the functionality portrayed in the sub-submenu of FIG. 17. Also shown is a depiction of sending a demo version of a game from the subject user to the compatible user.

Like reference numerals denote like elements throughout.

It is noted in this description that the terms "user" and "player" are used generally interchangeably. A "subject" user or player is one for whom compatibility determinations are being made.

DETAILED DESCRIPTION

In the described system and method, a subject user can identify other users who may be good matches for interaction based on a compatibility score determination made by the system. In one example, users may identify other users with whom to play online games (e.g., EverQuest® II provided by Sony Online Entertainment LLC).

Figure 1:
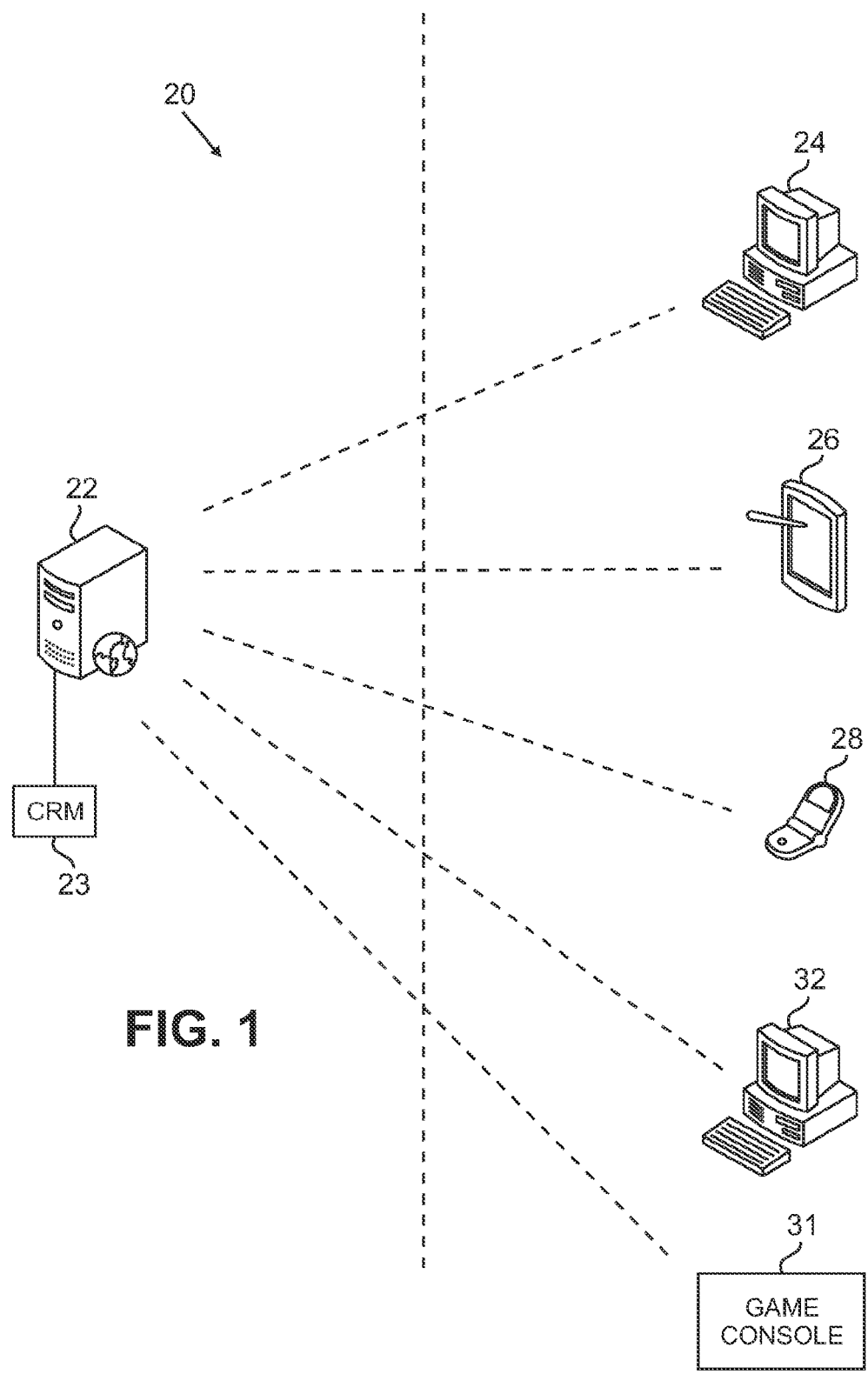
FIG. 1 illustrates a structural diagram of a networked environment, such as an online multiplayer game environment, in which users may employ multiple types of computing devices to communicate with the network.

Referring to FIG. 1, a system 20 is shown in which compatible users may be identified. A server 22 may, in part, execute instructions retrieved from a computer-readable medium 23. The system may be embodied as software stored on the computer-readable medium 23 which executes on a server, while the users have client software executing on their own computing devices, shown in exemplary form as desktop computer 24, tablet computer 26, smart phone 28, desktop computer 32, and game console 31. Of course, any other type of computing device may also be employed. The system can operate in conjunction with an online game service, e.g., as a component or sub-service, or can be independent, e.g., may operate from a separate web application or other network service.

Figure 2:
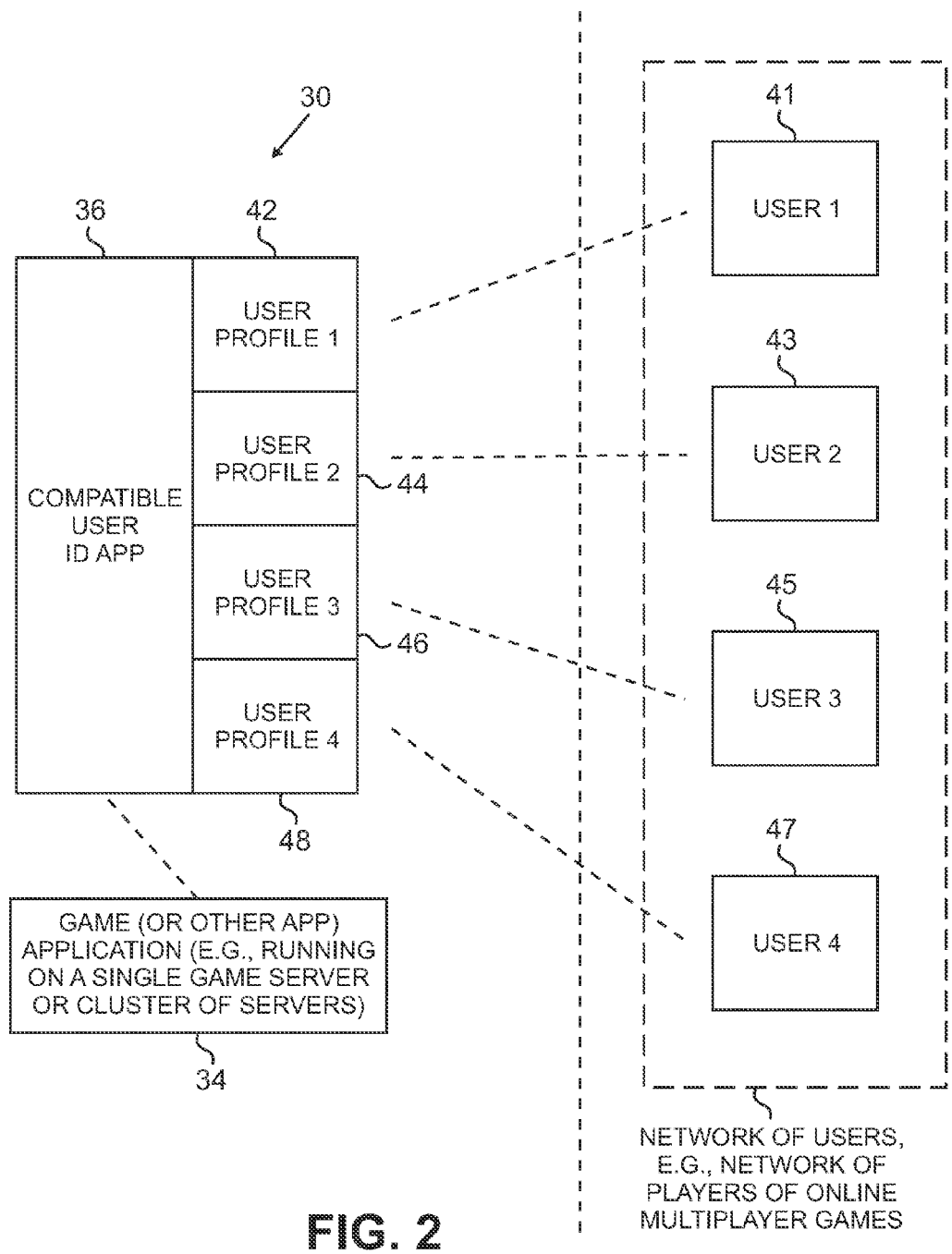
FIG. 2 illustrates a logical diagram of a networked environment, in particular a game environment, in which several users, each with a user profile, communicate with a compatible user identification application and a game application running on a game (or other variety) server.

Referring to FIG. 2, a software application 30 is shown that identifies compatible users. The software application includes a compatible user identification application 36. The compatible user identification application 36 compiles information about users, shown in exemplary form in FIG. 2 as users 41, 43, 45, and 47, by automatic collection of data as well as by an active collection of data, where the active collection may include data input by users either on the user's initiative or in response to questions posed by the system. From the compiled information, the compatible user identification application 36 creates a profile for one or more users (generally for all users). In FIG. 2, each user 41, 43, 45, and 47, has a corresponding profile 42, 44, 46, and 48, respectively. The users may constitute any type of network, including students, workers, or the like. In this description, however, the users are generally players of online multiplayer games.

Figure 3A:
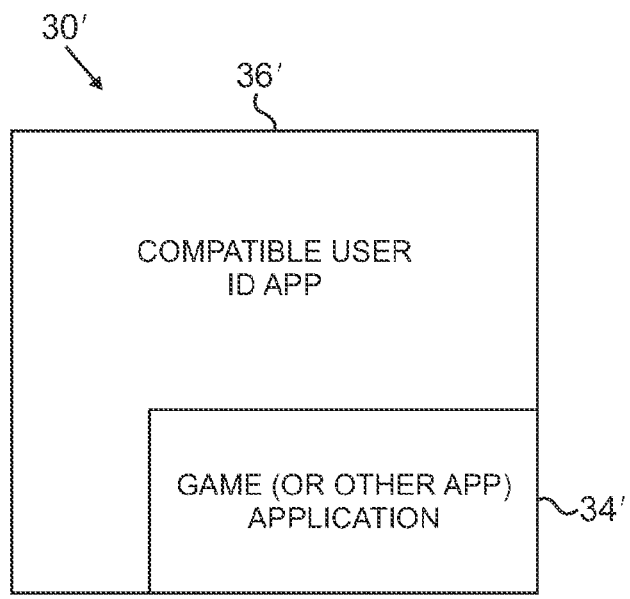
FIGS. 3(A) and 3(B) show alternate arrangements between the system and a game application.
Figure 3B:
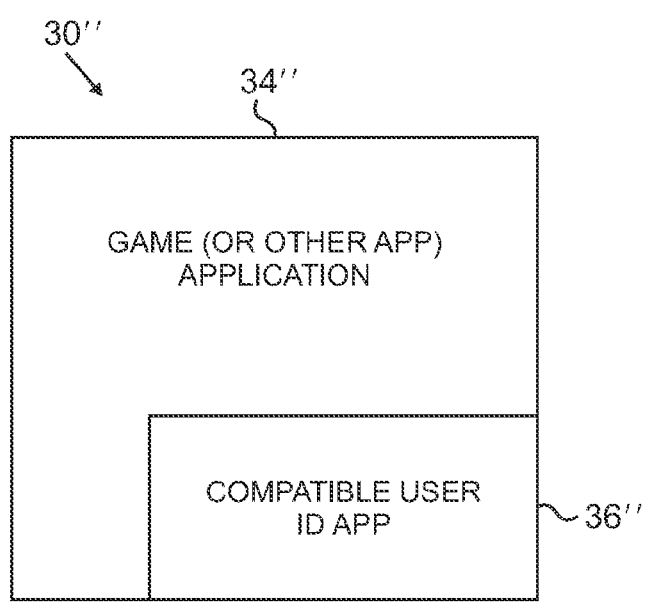

The compatible user identification application 36 may run on a server that is in communication with a game server running a game application 34. This may be the case where the compatible user identification application 36 forms a separate application that runs on a separate web site or application or other network service. Alternatively, as shown in FIG. 3, the compatible user identification application and the game application may run on the same server. In FIG. 3(A), a compatible user identification application 36' includes a game application 34' within the same. This may be particularly suitable where, for example, the compatible user identification application 36' hosts several games as part of its offerings. In FIG. 3(B), a game application 34" has its own compatible user identification application 36". This may be particularly suitable for a large MMO where, for example, numerous players within the game are attempting to find suitable or compatible users. In another implementation, the compatible user identification application and the game application are included within another management application (e.g., one that manages several related or affiliated game applications) or are external to but accessible by the management application.

Figure 4:
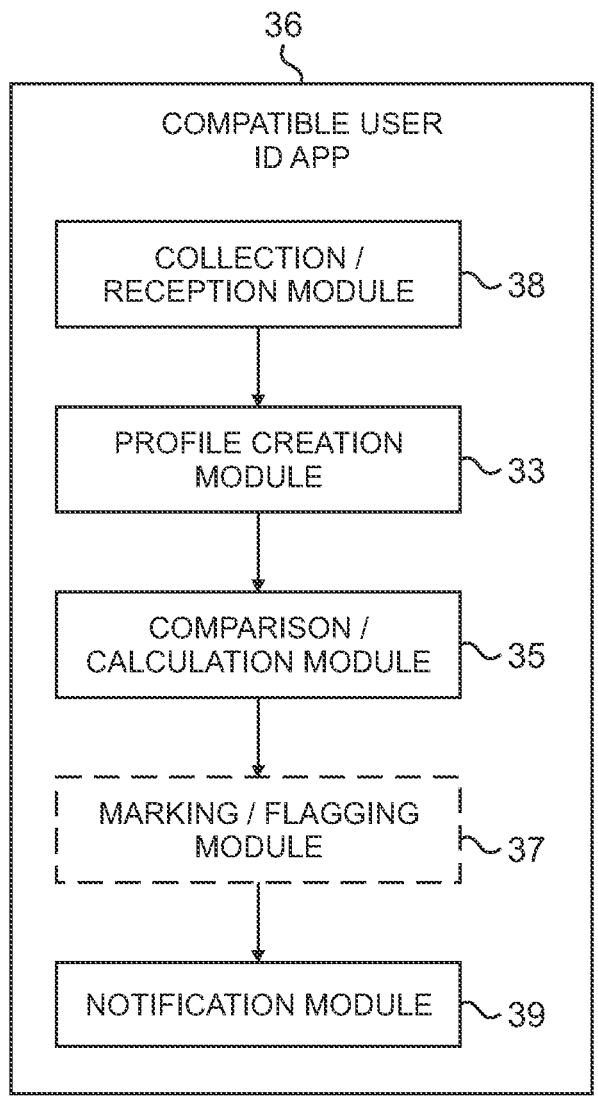
FIG. 4 illustrates data flow between modules constituting the system.

FIG. 4 illustrates a modular view of the compatible user identification application 36. The compatible user identification application 36 may include a collection and/or reception module 38, which is responsible for collecting or otherwise receiving data that is then employed in the determination of compatible users. In particular, the system collects information about a user to build a profile of the user. Various types of information can be collected, such as games owned, games used, preferences, demographic information, and other information useful for matching players (see Table I). The information may be collected automatically (e.g., through information organized or monitored by the system such as amount of time spent playing a game, at what time the game is played, who the user plays or interacts with, what professions the user's character(s) has, which quests the user's character(s) has, software or data stored on the user's computer system(s), and the like). Another example of collected information is information recorded by the system reflecting how the user plays games and their corresponding game behavior (e.g., group versus solo play, quests versus player-vs.-player, killing enemies versus exploration, and the like). The information may also be collected manually. For example, information may be requested from a user or received through a form, such as the user's geographic location, profession, hobbies, gender, etc. Other ways of information collection are described below.

The collected data are employed to create a profile in a profile creation module 33. Of course, the profile may simply be the stored data, in which case stored data may be compared directly in order to determine compatible users.

A comparison and/or calculation module 35 compares the profile information of users to determine compatibility information between them, and may calculate a compatibility score, which may then be assigned to the compared pair. The comparison can be made and updated automatically or on demand. The comparison can be for all user profiles, or may be limited to particular users or subsets of users (e.g., filtered). In the case where a multiplayer game is spread over several servers, the comparison may be (but is not limited to) comparing users on the same server. In another example, the comparison is for users that are on the same network (e.g., the same LAN) or subscribers to the same service (e.g., a social networking service/website).

In one example of matching, the system uses interest information to predict compatible personalities, e.g., similar age, hobbies, etc. In another example, the system uses play style information, e.g., similar playing times, similar playing durations, preference for playing in groups, etc. In another example, the system uses game information to predict complementary matches, e.g., characters that have the same quests, characters that are in the same faction or team, characters that have complementary in-game skills such as mining and blacksmithing, etc. Of course, various combinations of these and other matching techniques can also be used.

An optional marking and/or flagging module 37 may then be employed to mark, flag, or otherwise tag a subject user's profile as being compatible with another user. The mark or flag may then be employed by a notification module 39 to determine which players should be displayed on a "compatible players" list or other such notifier. The mark or flag may vary depending on the degree of compatibility determined. Also, the marks or flags may be persistent, and may be updated as profiles change, are added or deleted, or are edited.

It should be noted that the system may operate without any marking or flagging as well—in this case, a comparison may be made of the current available profiles to determine compatibility scores and the scores employed to cause notifications. In that case, no reference need be made to any prior marking or flagging.

The notification module 39 presents some or all of the compatibility information for a user to the subject user, such as through a web page or through a GUI of a client application executing on the subject user's system. In one example, the system presents a list of users, each with a graphical icon indicating the degree of estimated compatibility, e.g., a green circle for a highly compatible user, a yellow circle for an average result, and a grey circle for a low compatibility score.

In another example, the system presents compatibility information to the user inside a game, directly or through an indicator leading to additional information, e.g., through a pop-up image or aura over a player's character, through an in-game messaging system, though a field in an entry in a "phonebook" or organization list, such as a guild list, through displaying player names in different colors, of the like.

The compatibility information can be requested in-game. For example, the subject user selects another player in the game interface and requests a compatibility rating. The game then updates the display to show the compatibility information (e.g., an aura around the selected player or pop-up box of information). In another example, the system presents compatibility information to the user in an online environment, such as a lobby area or an online community where players are represented by avatars or indicated by names. This display could help players locate similar players to match up for game visually rather than by searching. Similarly, the visual display can be customized by the user (e.g., display a blue aura for players with similar play styles and an orange aura for players on the same LAN).

The modules described above may be situated on one server or may be combined onto different servers in any number of ways. Moreover, one or more modules may be situated on a game or other network server.

Figure 5:
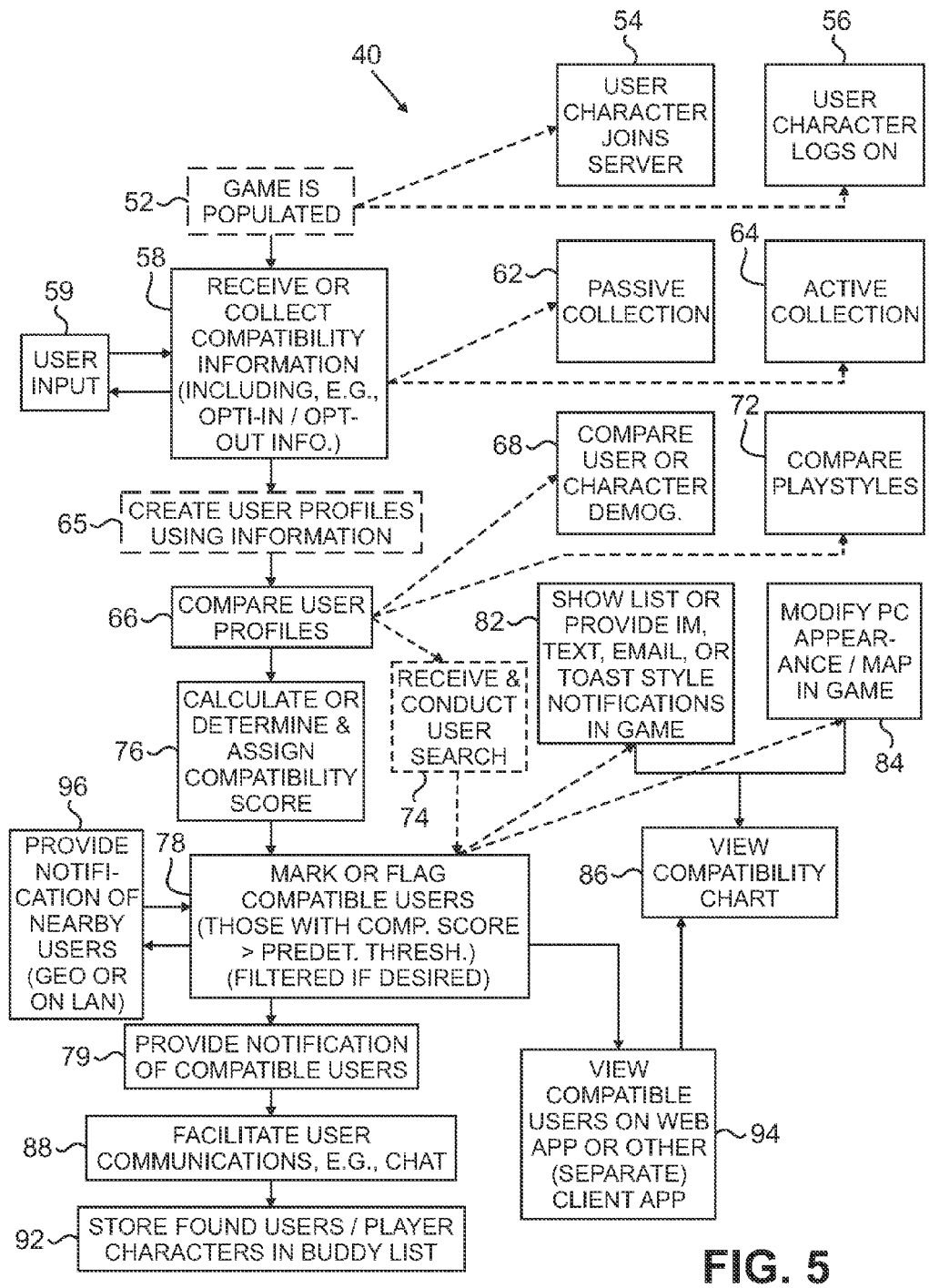
FIG. 5 is a flowchart of a method for identifying compatible users in a network environment such as a game environment.

FIG. 5 is a flowchart of a method 40 for identifying compatible users. Prior to commencement of the method 40, a game is populated with players (step 52). This may include, e.g., a user adding a character to a game (or game server) (step 54) or a user logging on (step 56) with a character that has already been created.

A first step is to receive or collect compatibility information (step 58). This step may involve a passive collection of data (step 62) or an active collection of data (step 64). In a passive collection (step 62), the system analyzes play style or other statistics that can be measured based on the player's usage parameters and characteristics. For example, the system can measure when the player logs on and logs off and can determine an average duration of play as well as likely times of play on a weekly or other periodic basis. In an active collection of data (step 64), the system may pose questions that may be optionally responded to, such as during user log-in. Other forms, for user completion or entering of data, or other such active methods, may also be employed to collect user data.

It is noted that step 58 may include an opt-in or an opt-out step. The system may receive information that a player has opted-out of the system, or failed to opt-in, and then their information would not be analyzed for compatibility.

A user may also log on to the service administering the compatible user identification application 36 to edit their data or input additional data (step 59). For example, if the compatible user identification application 36 is located in-game, a button, menu item, or other such device in the game may be employed to allow the user to enter or edit data. Alternatively, a lobby or in-game "meeting place" may be established into which a character operated by a user may enter. The user may cause their character to manipulate various menus within the meeting place to enter data. Outside of a game, a subject user may simply log on to a web application or employ another client service to access their user data.

A user profile may then be created (step 65). As noted above, the profile need not be a separate data structure, although in many cases it is. The profile may simply be the compilation of the user data.

For a given subject user, the subject user's profile may then be compared to some or all of the other users for whom profiles or data are available (step 66). This step may be performed on a per-user basis, e.g., upon subject user log in, or may be performed periodically for all users, e.g., where all user profiles are compared in all permutations on a regular basis. In the latter case, the results may be stored for retrieval and display when a given subject user logs in. Numerous variations will be apparent.

The comparison may include a comparison of user or character demographic data (step 68), as well as a comparison of play style (step 72). Other types of comparisons may also be seen. It will be clear, given the description here as well as the exemplary parameters in Table I and in the figures, that a comparison algorithm may include any number of variables. In many cases the comparison algorithm will involve a determination of overlap, i.e., how much of one user's given variable is like another user's given variable. For example, if one user plays a game at almost the same time each day as another user, they will have a large overlap in their playtime parameter. If that were the only basis of comparison, they may be highly compatible.

In general, a number of parameters may be involved, and the parameters may be weighted according to the importance of the variable to the compatibility. For example, the appearance of player characters may bear little relation to the overall user compatibility. This may be especially true for a "default" compatibility determination. However, a subject user may also perform a customized search (step 74) to locate other compatible players. In this case, the subject user is choosing which parameters or variables to weight highly by virtue of the search query employed. User profiles that match the search query are then returned using the notification systems and methods described.

Shown in a separate step in FIG. 5, the comparison may include a calculation or determination, and assignation, of a compatibility score (step 76). This score may be high if the users are highly compatible, and low if they are not. The use of a quantifiable score is especially useful when a determination is made, not just of whether users are compatible, but also how compatible they are. A compatibility score may then be translated into a color, for a displayed name or player character aura, the color indicating the degree of compatibility. Other types of indicators of degrees of compatibility will also be apparent.

Compatible users may then be marked, flagged or otherwise tagged (step 78). In this way, results of the comparison may be stored for later retrieval. In some systems, the compatibility determination may be conducted upon each log in, so that no marking or flagging is necessary. In the case where a compatibility score has been determined, the marking or flagging may occur with respect to those users (relative to the subject user) for which the compatibility score exceeds a predetermined threshold. Different marks or flags may be employed to indicate different levels of compatibility.

In some cases, certain information may indicate that users are playing in a nearby location or even on the same LAN. For example, some systems may employ geolocation routines that can determine the approximate geographic location of a player based on the player's IP address. The IP address can further determine if two users are using the same LAN. Using such routines, the system may then provide a notification to a user of other nearby users (step 96). Such information may be useful on its own, even in the absence of other compatibility factors. For example, two individuals in the same company or neighborhood may not be aware that each enjoys playing a particular multiplayer game. Such a notification would allow these users to realize and take advantage of a common interest. Depending on the desires of the user, geolocation information may be given a particularly high importance, a low importance, or the same may be treated like any other factor. In one implementation, these "nearby" users are displayed in a special group in a friends list. Further details are described below in reference to FIG. 12.

In any case, once the compatibility determination has been made, users may be notified of compatible players (step 79). For example, a list may be displayed in-game (step 82), and this list may appear similar to that of an instant messaging client. Other types of lists may also be employed. Toast-style notifications may also be caused to appear in game. In-game text messages or emails may be sent to a subject user. Rather than a list, a player character corresponding to a compatible user may be displayed with a modified appearance (step 84), such as a colored aura, or with pop-up text over the character, or may be made to appear on a map.

Outside of a game, compatible users may be viewed via a web application or other client application (step 94). Other ways of notifying a user of compatible users will be apparent and may also be employed.

Once the user has been notified of other compatible users, the subject user can then access some or all of the compatibility information on which the determination was made (step 86), such as the games played by a selected user. The user can select other users from the presented results and contact those users (step 88), e.g., via email or messaging. The user can also invite another user to play a game or open communication. As another option, a user can store one or more users from the compatibility results in a friends or buddy list for future use and reference.

The results of the compatibility determination may then be stored (step 92). The storing may be of all users found to be compatible or only those the user desires to be stored, such as by placing the compatible users on a buddy or friends list. Numerous other sorts of lists may be employed, such as a list of users the subject user enjoys grouping with to achieve a common goal, either for questing, trade skills, or the like. Other types of lists will be apparent.

Figure 6:
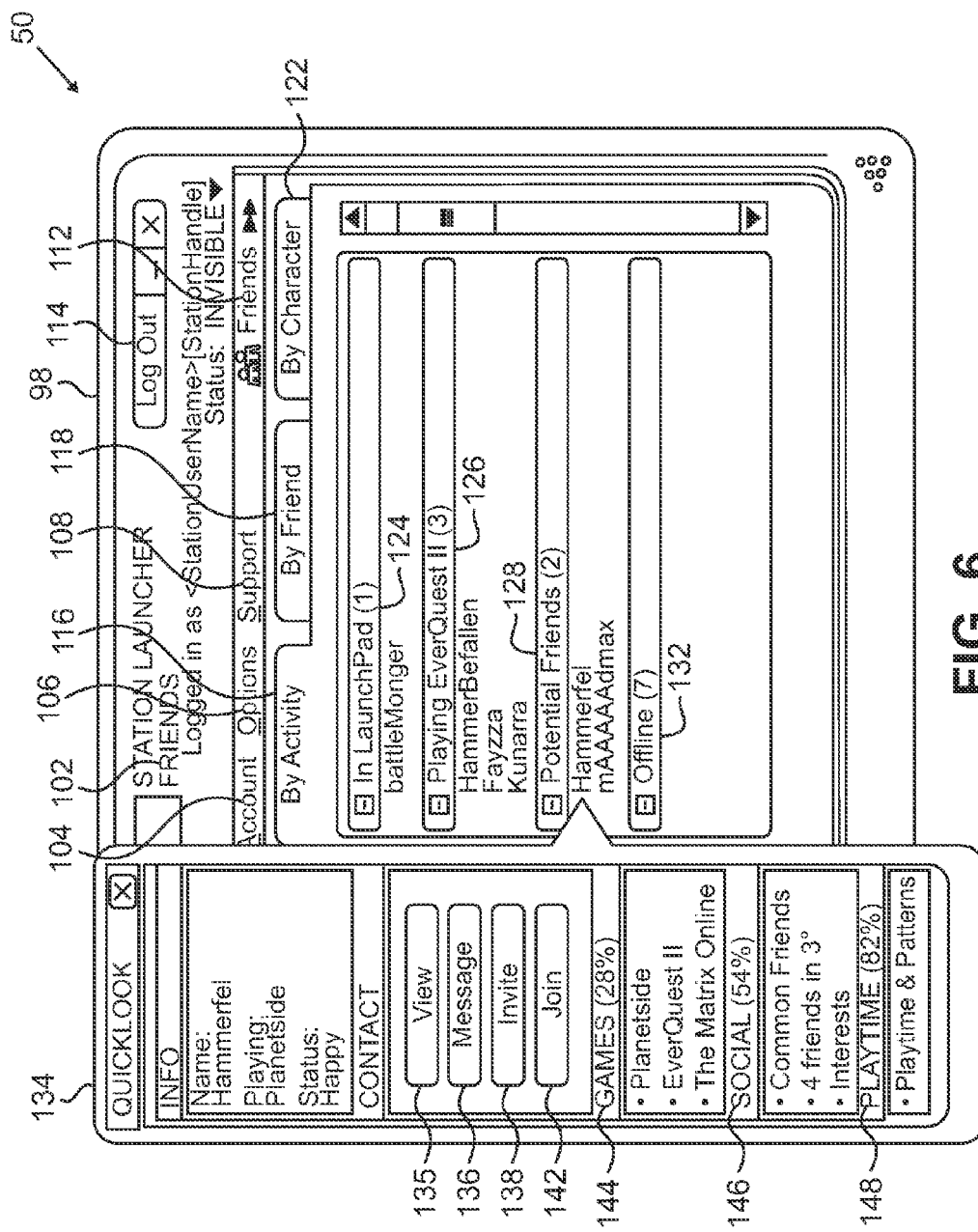
FIG. 6 illustrates a web page of an exemplary user interface in which compatible users or 'friends' may be identified and contacted.

FIG. 6 shows an exemplary user interface for a system for identifying compatible users. In all of the user interfaces described, all menu items, lists, and other elements are purely exemplary and are provided only to show an example of the implementation of the system and method. It will be understood that significant variations may be made in the layout and appearance of any of these elements in any given implementation.

The GUI includes a title 102 and menu items 104, 106, 108. Menu item 104 allows a subject user to access account features. Menu item 106 allows a subject user to access various options, such as those that pertain to display features. Menu item 108 allows a subject user to access support functionality. Another menu item 114 allows a subject user to log out of the system. A header 112 is similar to title 102, and indicates the "friends" functionality, which is in this example the term used for compatible users.

Compatible users include those who have already been placed on a list or group associated with a subject user and those who may potentially be invited to join a list or group associated with a subject user. Each is shown in FIG. 6. In the figure, tab 116 has been chosen, and so compatible users are shown grouped by activity. For example, some compatible users are in a lobby system as shown by first group 124. Some compatible users are already playing a given game, as shown by second group 126. Some compatible users are only "potential" as they have not yet been associated with the subject user, such as by being placed on a friends or buddy list, and these are shown by third group 128. Finally, some friends are shown as being offline, as indicated by the fourth group 132.

Besides being grouped by activity, compatible users may also be grouped by user name, and this feature may be accessed by choosing tab 118. Compatible users may also be grouped by their corresponding in-game character name, and this feature may be accessed by choosing tab 122.

FIG. 6 in addition shows a quick look box 134, which may be accessed by mousing over or clicking on a given friend in the central window. In the example of FIG. 6, certain details are being viewed about a compatible user who has not yet been added to a friends or other list. Various details of the compatible user may be seen, and buttons may be provided to: allow a view of more details about the potential friend (button 135); allow a message to be sent to the potential friend (button 136); allow the potential friend to be invited to play a game with the subject user (button 138); and allow the potential friend to be invited to join a friends list of the subject user (button 142). The quick look box 134 may also show games played by the user in common with the subject user (list 144), various social commonalties of the user with the subject user (list 146), and a percentage indication of common playtime with the subject user (list 148). Clicking or mousing over these lists may provide additional information where available.

Figure 7:
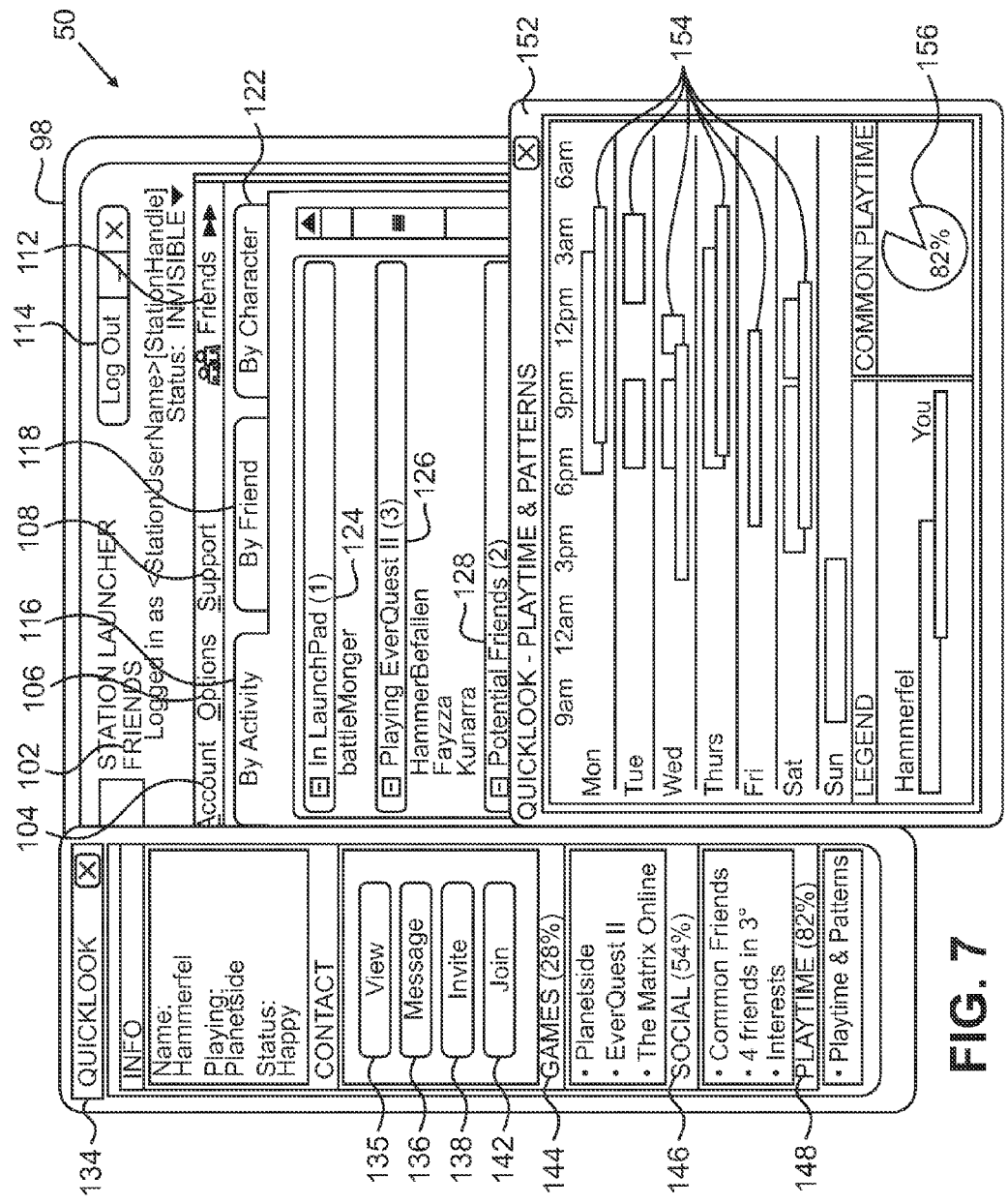
FIG. 7 illustrates a web page of an exemplary user interface in which compatible users or 'friends' may be identified and contacted, in particular showing a summary comparison of a subject user play schedule profile and a compatible user's play schedule profile.

For example, the effect of clicking or mousing over the "Playtime and Patterns" option in the "Playtime" list 148 is shown in FIG. 7. A graphical display 152 appears with bars 154 corresponding to the average playtime, for a given week, of the subject user and the compatible user. For each day, the two bars are shown adjacent each other for a clear graphical depiction of the average times each player plays the game. Other implementations may include latest play times or other such play time indications. A calculation is displayed, and in the exemplary FIG. 7 a pie-type chart 156 is shown, with a corresponding calculated percentage value of average overlap in play time.

Other ways may also be employed to demonstrate compatibility. For example, a display may be employed with an icon at the center representing the subject user and additional icons may surround the subject user's icon, each representing compatible users. The types of icons and the position of the icons may reflect the compatibility between the subject user and other users.

For example, a highly compatible user may have an icon displayed closer to the subject user's icon than a less compatible user. Similarly, a user in the same geographic locale as the user could have an icon representing that commonality.

Figure 8:
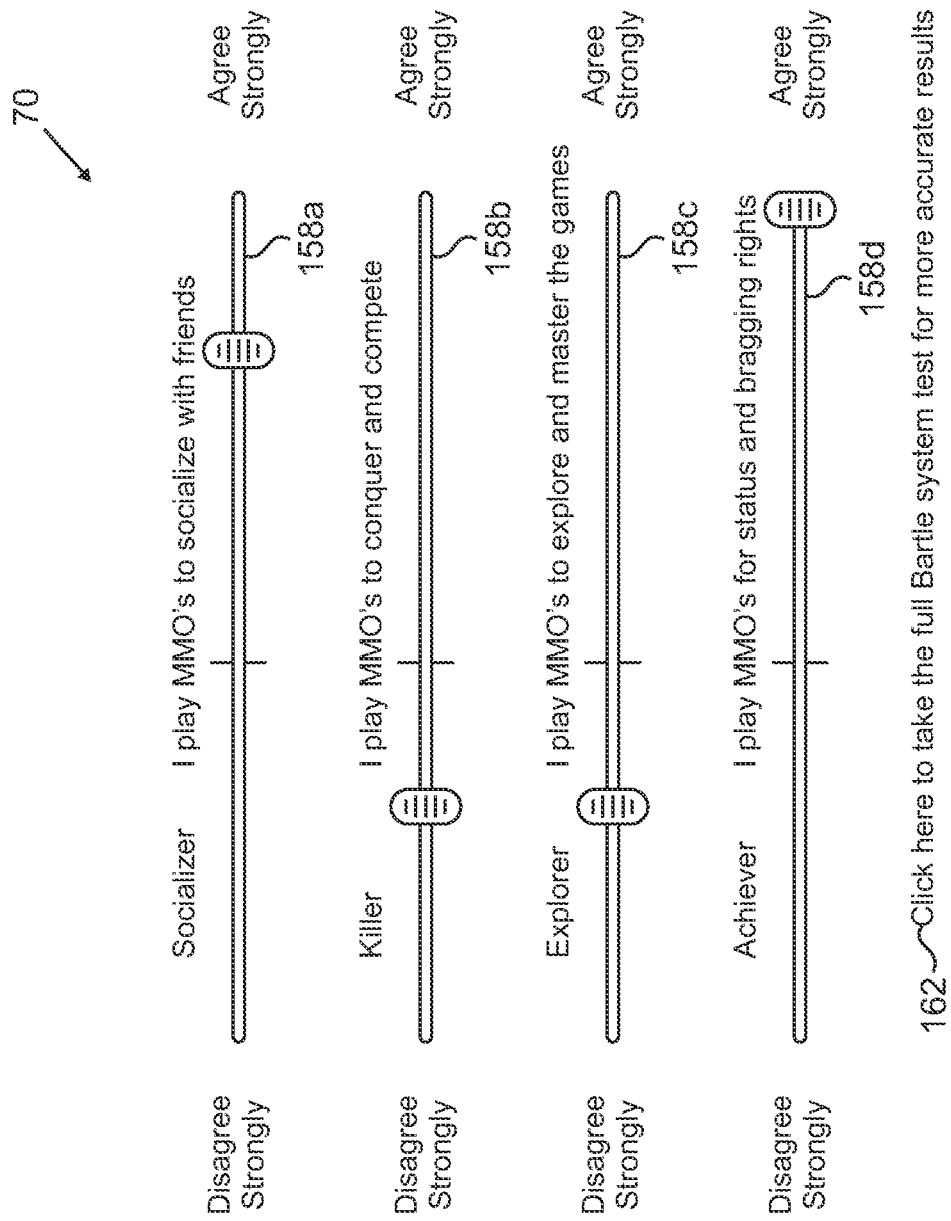
FIG. 8 illustrates a series of "slider" scales by which a user may enter data corresponding to their play style or behavior. Besides those shown in the figure, numerous other data may be requested.

FIG. 8 illustrates a user interface 70 in which users may enter additional information about themselves in order to provide more refined data and thus to result in enhanced compatibility findings. The user interface 70 shows four sliding-scale user responses to assertions posed by the system. In each case, the user may move a slider between a response of "Disagree Strongly" and "Agree Strongly". Of course, the format of the assertion, the endpoints, and the assertions themselves may vary according to the type of data desired to be obtained. In the exemplary FIG. 8, the first assertion and slider 158a relates to whether the user plays MMO games to socialize. The second assertion and slider 158b relates to whether the user plays MMO games to compete. The third assertion and slider 158c relates to whether the user plays MMO games to explore and master the games. The fourth assertion and slider 158d relates to whether the user plays MMO games to achieve a certain status. A button 162 may be provided to allow the user to retrieve even more questions that, upon responding, will further refine the user's profile.

FIG. 9 illustrates another type of form 80 in which users can enter additional data. The form 80 includes a series of checkboxes 164 in which users may check boxes corresponding to the games they play. Ratings for these games may be entered by drop-down menu choices indicated by menus 168 and 172. A series of checkboxes 166 may also be employed for providing data about preferred genres of games.

FIG. 10 illustrates a user interface 90 for gathering incremental user-entered demographic data. The user interface 90 is for logging on to a web application, the web application forming a starting location from which several games may be launched. As such, users enter a value in a username field 176 and a value in a password field 178. Users may also choose to answer a question 174 that is posed by the system for identifying users. In the exemplary FIG. 10, the question relates to play style, and may be answered by simply choosing one of the choices in a drop-down menu. The question may change with each log-in, in order to obtain as much information as desired. A user may choose to not answer these incremental questions, may choose to answer one or several, or may choose to answer all. While the above has been described in the context of logging on to a web application from which several games may be launched, it should be clear that the same may be employed in other scenarios as well, such as a stand-alone web application specifically for compatibility determinations, a log-in screen for a specific game, or the like. FIG. 11 shows a related user interface 100. In this case, the question 182 relates to whether the subject user enjoys grouping with other players when playing MMOs.

Figure 12:
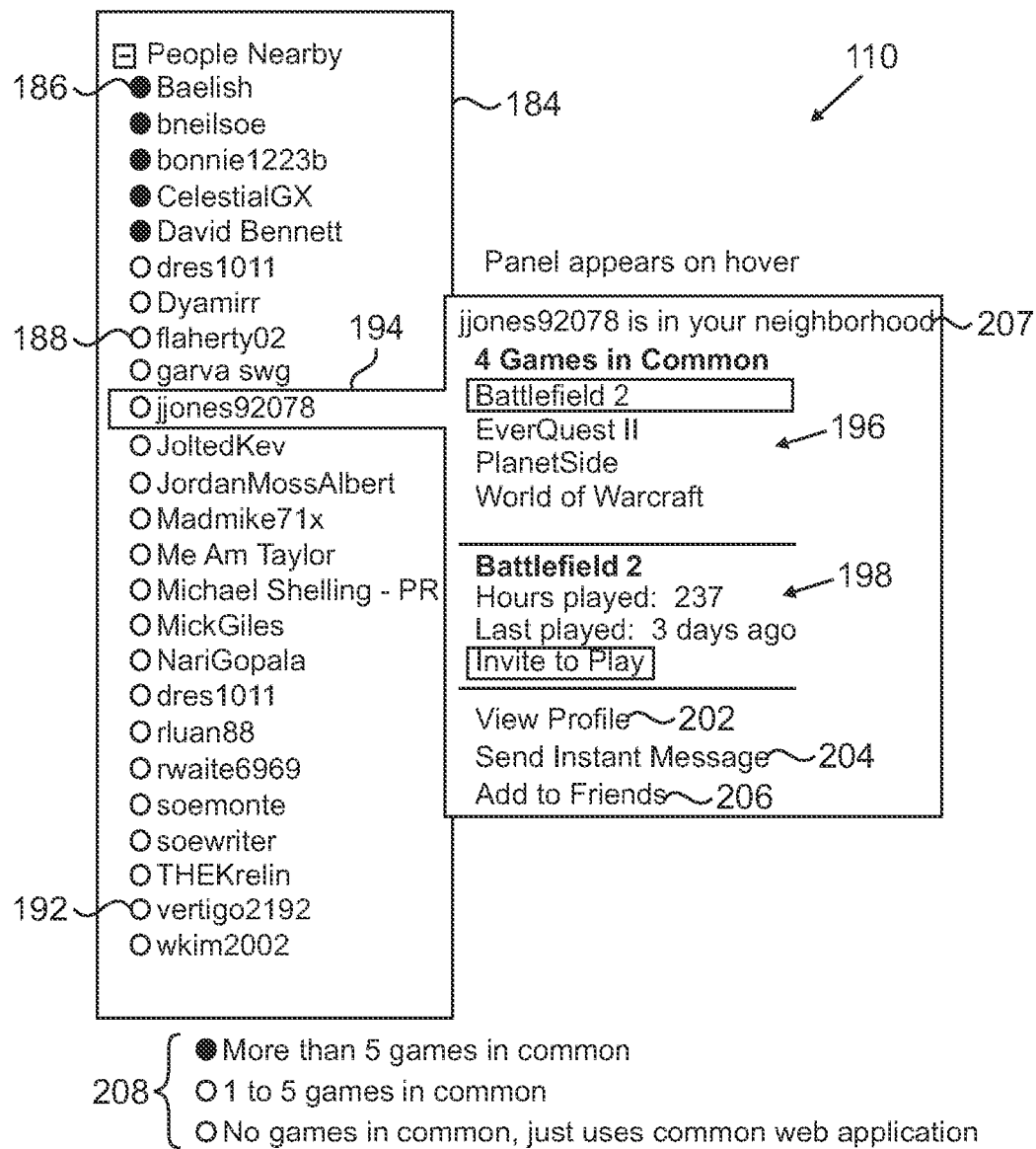
FIG. 12 illustrates an exemplary web page of a user interface in which compatible users or 'friends' may be identified and contacted, in particular showing a list of compatible users that have been located on the subject user's LAN or otherwise determined to be geographically near the subject user, such as via geolocation software.

FIG. 12 illustrates a user interface 110 through which the system may notify a subject user of compatible users that are on the subject user's LAN or are otherwise located nearby the subject user, as determined by, e.g., geolocation software. The user interface 110 shows a main list 184, with many nearby users listed. Each has a circle that identifies the degree of compatibility of the listed user, and the circles have (in this example) three degrees of shading. A legend 208 describes the shading scheme.

As can be seen by comparing list 184 and legend 208, user 186 and the subject user have more than five games in common. User 188 and the subject user have one to five games in common, and user 192 and the subject user have no games in common, though they may share a common web application or other network application that administers their game play.

By clicking on or mousing over a name in the list, the subject user can see additional details about the named user. For example, a list of games in common 196 may be displayed. By clicking on or mousing over a name of a game in the list, the subject user can see additional details (list 198) about the named user's play of the game. Other menu options may allow the subject user to view the user's profile (option 202), send an instant message to the other user (option 204), or add the user to the subject user's friends list (option 206).

As may be seen, indicators 207 may be provided to show if the user is on the subject user's LAN or is nearby as may be determined by analysis of their IP address.

Figure 13:
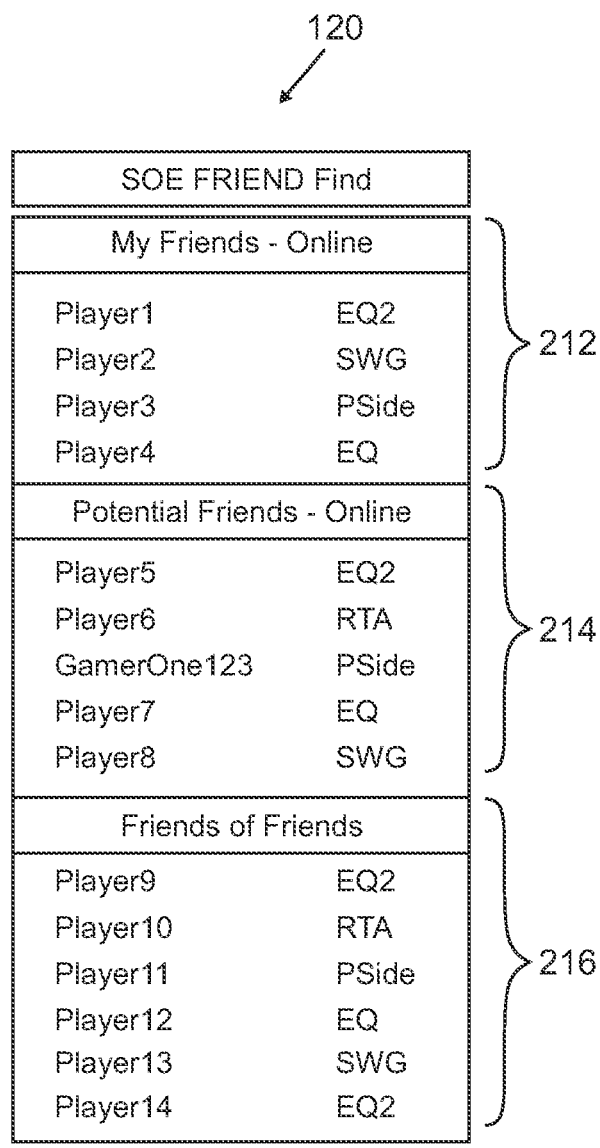

FIG. 13 illustrates a user interface 120 that displays the results of a compatibility identification. In particular, a center list 214 displays a list of "potential friends", i.e., those for whom the system has determined the subject user may be compatible with. For example, these may represent those users for which a compatibility score, calculated relative to the subject user, exceeds a predetermined value. The top list, i.e., friends list 212, represents those users who are already on the friends list of the subject user. These may have been invited to join at the request of the subject user, or vice-versa, and/or they may have been previously found and added to a friend's list via the system for identifying compatible users. The bottom list, a friends-of-friends list 216, represents a list of friends who are on the friends lists of the subject user's friends. These may, in one implementation, represent all the friends on these lists, or in another implementation may represent just those friends for whom a certain level of compatibility is achieved. It is noted that lists 212 and 214 each are shown indicating users who are online at the time of the display; however, in other implementations, both online and offline users may be displayed.

Figure 14:
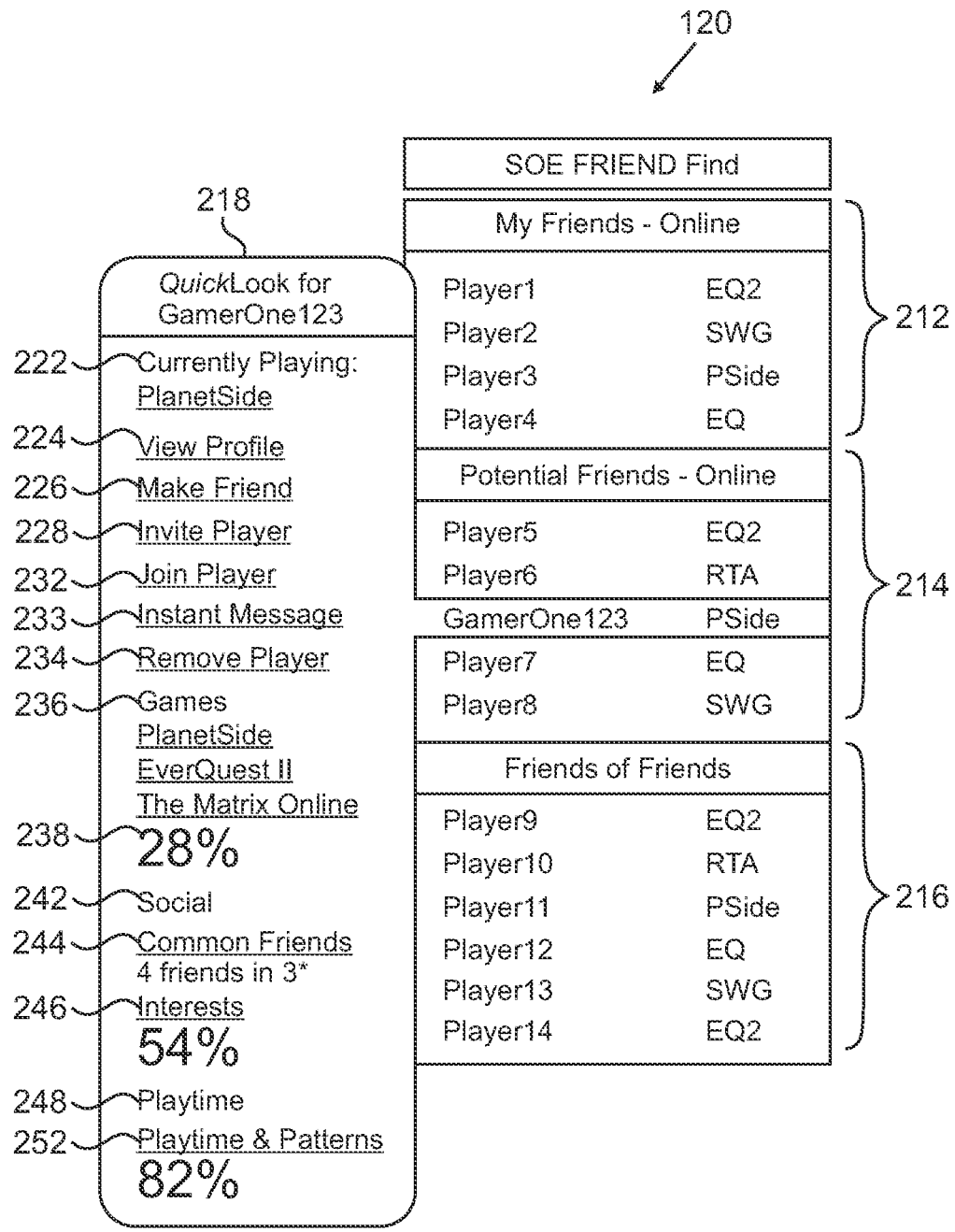
FIG. 14 illustrates an exemplary result of the subject user clicking on or mousing over an entry in the middle list of FIG. 13. In particular, a submenu including various menu options as well as the overlap value of certain parameters are displayed.

FIG. 14 illustrates the graphical effect of the subject user clicking on or mousing over one of the users in the list 214 (i.e., potential friends). A "quick look" box 218 appears in the user interface 120 that lists a number of informational details about the potential friend, including: the game the potential friend is currently playing (item 222), a button to view their profile (item 224), a button to invite the potential friend to join the subject user's friends list (item 226), a button to invite the potential friend to play a game with the subject user (item 228), a button to ask the potential friend if the subject user can join the same in playing a game (item 232), a button to send the potential friend an instant message (item 233), a button to remove the potential friend from the list (item 234), a list of games the subject user and the potential friend have in common (item 236) and a percentage indication of the same (item 238), a social menu (item 242) including an indication of any friends the subject user and the potential friend have in common (item 244), as well as an interests menu (item 246) and a percentage indication of the amount of commonality in interests, a playtime menu (item 248), as well as a menu item for playtime and patterns (item 252) and a percentage indication of the amount of commonality in playtime and patterns.

Figure 15:
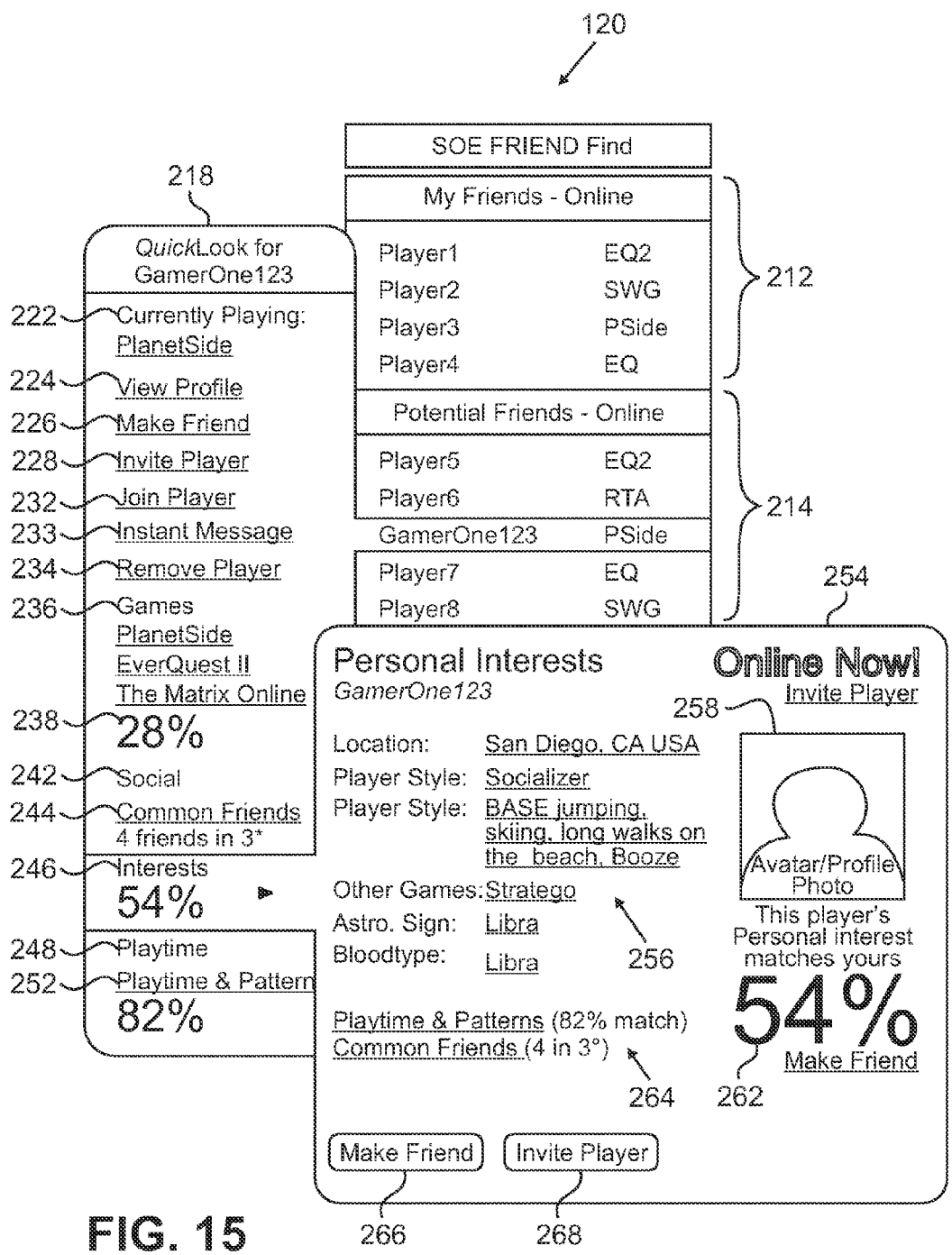
FIG. 15 illustrates an exemplary result of the subject user clicking on or mousing over an entry in the submenu of FIG. 14. In particular, a sub-submenu including various details of the given user are displayed, as well as buttons which may be employed to add the user to a friend's list.

FIG. 15 indicates the effect of mousing over or clicking on the interests menu (item 246). A box 254 may appear, giving additional details about the interests of the potential friend. The box 254 may provide additional demographic details 256 as well as a photo or avatar of the potential friend 258. A key parameter, playtime and patterns, may be called out (item 264) as well as an indication of the amount of overlap. An indication may also be provided of the overall overlap in interests of the subject user and the potential friend (item 262). This overall overlap would take into account both the overlap in playtime and patterns and also the overlap in other interests. By reviewing the size of the overlap, a subject user may obtain an idea of how compatible the other user would be to play with. Buttons may also be provided to ask the potential player to join the subject user's friends list (button 266) as well as to invite the potential friend to play a game (button 268). This latter functionality may be viewed particularly valuable for players who wish to play a game with a player one or more times prior to inviting the same to join a friends list.

Figure 16:
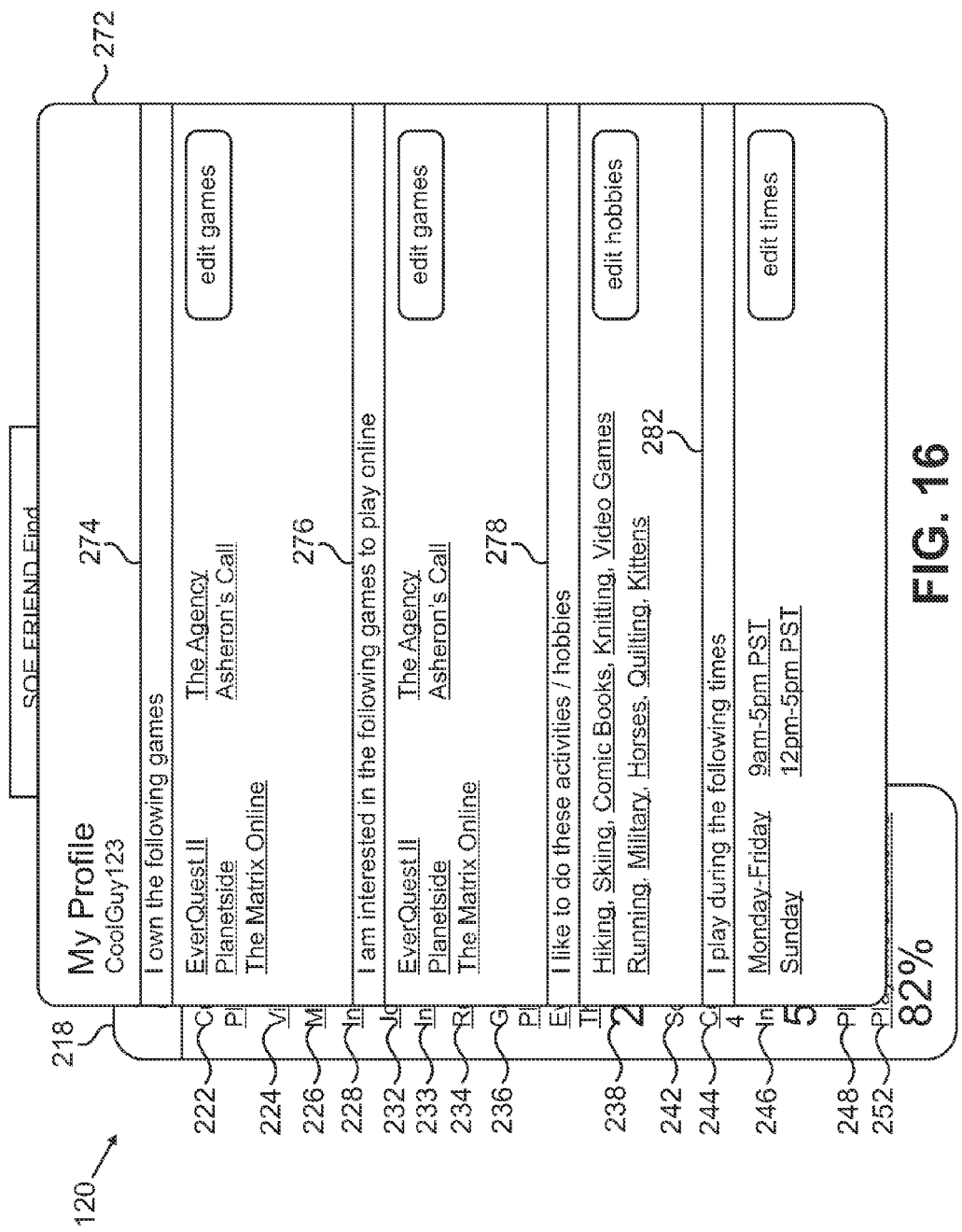
FIG. 16 illustrates an exemplary summary profile for a subject user.

FIG. 16 illustrates the effect of mousing over or clicking on the profile button (item 224) on the user interface 120. A box 272 appears, giving additional details about the profile of the subject user. The box 272 may provide additional details about games owned by the subject user (list 274), and may further indicate what games the user is interested in playing online (list 276). Such information may give other users, including those who are deemed compatible with the subject user, an indication of what games the subject user would accept invitations to play. Other information may also be included, including, e.g., a list of hobbies (list 278), as well as an indication of when the subject user is generally available or desirous of playing online games (list 282).

FIG. 17 illustrates the effect of mousing over or clicking on the invite player button (item 228) on the user interface 120. A box 284 appears, listing the games owned by both the subject user and the potential friend (list 286), the games owned by the subject user only (list 288), and the games owned by the potential friend only (list 292). For games owned by both, a button 298 may be provided by which the subject user may ask the potential friend to play the game. Following such a request, an indication 294 may be provided to indicate that a response is outstanding. In the case where only the subject user owns a game, a button 302 may be provided by which the subject user may send a demo version of the game to the potential friend (or cause one to be sent). An indication 296 may be displayed, showing that the demo version is being sent. In the case where only the potential friend owns a game, a button 304 may be provided by which the subject user may request the sending of a demo version of the game from the potential friend.

FIG. 18 illustrates the user interface 120 of FIG. 17 in the case where the potential friend has issued an invitation to play a game (box 306) to the subject user. The subject user may either accept or decline. Also in FIG. 18, a box 308 indicates that the subject user is in the process of sending a demo version of a game to the potential friend. The same would generally be via use of a button 302 as was seen in connection with FIG. 17.

One implementation includes one or more programmable processors and corresponding computer system components to store and execute computer instructions, such as to provide the collection, storage, and comparison of user information.

The present system for identifying compatible users may be implemented in any number of computing systems, including laptop computers, desktop computers, tablet computers, handheld computers, personal digital assistants ("PDAs"), mobile phones, smart phones, game consoles, personal media players, handheld game devices, and the like.

According to the above description, a system and method have been described to implement a technique for identifying users with similar interests or activities. A compatible user identification application executing on a server collects data about multiple users indicating the users' characteristics, such as by automatically gathering and storing data indicating online activities, software owned, and demographic information. The compatibility application determines compatibility information between users based on the collected information. The compatibility application provides some or all of the compatibility information to a user through a GUI on the user's computer system (e.g., through a web tool). A user can interact with the compatibility information to identify other users that may be good matches for playing games together.

Other variations and implementations are also possible. For example, the system could be used entirely within a particular game to identify other players of the same game as possible matches for cooperative or competitive play. In another example, implementations could be developed for other online services besides games, such as chat, telephony, or video conferencing. In educational embodiments, the system and method may be employed to find other students of similar education levels and needs. The importance or weightings of the various compatibility parameters may be set by the subject user in order to retrieve profiles of other users according to desired compatibility factors, although default values may be provided for users who do not wish to adjust weightings at this level of detail. The subject user can at any time adjust their own compatibility data and see updated compatibility results. A group within a game, such as a guild or the like, may set up (or have automatically created by analysis of members' playing habits) a profile through which new and compatible group members may be located and recruited. Within a currently-existing group, play style may be analyzed to determine or forecast the compatibility of group members. While the above description has focused on comparisons of two users at a time, three or more users may have a group compatibility score determined. The compatible user identification application, the game application, web applications, and the like, may be disposed on the same or different servers as appropriate.

Accordingly, the scope of the disclosure is not limited only to the specific examples described herein. Rather, the scope of the invention is to be limited only by the claims appended herein, and equivalents thereof.

TABLE 1

Non-Exhaustive List of Potential Compatibility Parameters

| Behavioral Parameters | Exemplary Values | Volunteered Demographic Data & Interests | Exemplary Values |
| --- | --- | --- | --- |
| Games played | Everquest Everquest 2 The Agency Star Wars Galaxies | Play Style | Achiever Explorer Socializer Killer |
| Server(s) | Server 1 Server 2 | Blood Type | A, B, AB, O |
| Levels of characters | 2 level 70 characters | Astrological Sign | Cancer Scorpio |

TABLE 1-continued

Non-Exhaustive List of Potential Compatibility Parameters

| Behavioral Parameters | Exemplary Values | Volunteered Demographic Data & Interests | Exemplary Values |
|---|---|---|---|
| Faction of characters | 1 level<br>60 character<br>Faction 1<br>Faction 2 | Stated Preference for compatibility | Male users<br>Female users |
| # of characters | 5 | | |
| What time of day user plays (measured or as-stated) | 6 pm to 9 pm | | |
| What day of week user plays (measured or as-stated) | Fridays and Saturdays | | |
| Session length (measured or as-stated) | 3-4 hours | | |
| Classes played | Guardian<br>Monk<br>Templar | | |
| Tradeskills | Weaponsmith<br>Provisioner<br>Outfitter | | |
| Quests | Quest 1<br>Quest 2 | | |
| Compatible items in inventory | Items that have synergy with each other | | |
| IP Address | Neighborhood<br>LAN | | |
| Geographic Data (Provided or detected) | Local city | | |

What is claimed is:

1. A method for matching user profiles in a gaming network, the method comprising:
   collecting data about each user that plays in the gaming network, wherein the collected data includes in-game data collected from a plurality of different games;
   generating a user profile for each user based on the collected data, wherein the generated user profile includes one or more common variables, and wherein the one or more common variables are obtained from processing the in-game data collected from the plurality of different games played by the user within the gaming network;
   storing the generated user profiles for each user in memory;
   receiving a compatibility request from a user device of a first user sent in real-time over a communication network, wherein the compatibility request concerns compatibility with one or more other players with respect to at least one specified variable;
   executing instructions stored in memory, wherein execution of the instructions by a processor matches the first user to a second user by:
      comparing the user profile of the first user with the user profiles of a plurality of other users in the gaming network, wherein each comparison outputs a corresponding compatibility score that is based on a degree of overlap with respect to the at least one specified variable, and wherein the customized compatibility request incorporates weights to the outputted compatibility scores, and
      identifying that the first user is compatible with the second user based on the comparison of user profiles when the outputted compatibility score between the first user and the second user meets a pre-determined threshold; and
   sending a notification over the communication network to the first user, wherein the notification is displayed at the user device of the first user and includes a marking that indicates a level of compatibility between the first user and the second user based on the compatibility score between the first user and the second user, wherein a different marking is used to indicate a different level of compatibility, and wherein detailed information regarding the matching is displayed for the user to view upon user interaction with the notification.

2. The method of claim 1, wherein the comparison is performed upon log-in of the first user.

3. The method of claim 1, wherein the comparison is performed periodically for the first user.

4. The method of claim 3, wherein results of the comparison is stored in memory, and wherein the results of the comparison are subsequently retrieved.

5. The method of claim 1, wherein the user profiles include one or more languages spoken, and wherein the overlap pertains to a common language spoken by the first user and by the second user.

6. The method of claim 1, wherein the user profiles include age, and wherein the overlap pertains to a common age range in which the first user and the second user fall.

7. The method of claim 1, wherein the user profiles include playing style information, and wherein the overlap pertains to similarities in playing style of the first user and of the second user.

8. The method of claim 1, wherein the user profiles include skill sets, and wherein the overlap pertains to a common skill exhibited by the first user and by the second user.

9. The method of claim 1, wherein the processor further matches the first user to a plurality of users for a multiplayer game title.

10. An system for matching user profiles in a gaming network, the system comprising:
   memory that stores generated user profiles;
   a communication interface that:
      collects data about each user that plays in the gaming network, wherein the collected data includes in-game data collected from a plurality of different games,
      generates a user profile for each user based on the collected data, wherein the generated user profile includes one or more common variables, and wherein the one or more common variables are obtained from processing the in-game data collected from the plurality of different games played by the user within the gaming network, and
      receives a compatibility request from a user device of a first user sent in real-time over a communication network, wherein the compatibility request concerns compatibility with one or more other players with respect to at least one specified variable; and
   a processor that matches the first user to a second user by:
      executing a comparison and calculation module to compare the user profile of the first user with the user profiles of a plurality of other users in the gaming network, wherein each comparison outputs a corresponding compatibility score that is based on a degree of overlap with respect to the at least one specified variable, and wherein the customized compatibility request incorporates weights to the outputted compatibility scores, executing a marking and flagging module that identifies that the first user is compatible with the second user based on the comparison of user profiles when the outputted compatibility score between the first user and the second user meets a pre-determined threshold; and executing a notification module to send a notification over the communication network to the first user, wherein the notification is displayed at the user device of the first user and includes a marking that indicates a level of compatibility between the first user and the second user based on the compatibility score between the first user and the second user, wherein a different marking is used to indicate a different level of compatibility, and wherein detailed information regarding the matching is displayed for the user to view upon user interaction with the notification.

11. The system of claim 10, wherein the comparison is performed upon log-in of the first user.

12. The system of claim 10, wherein the comparison is performed periodically for the first user.

13. The system of claim 12, wherein results of the comparison is stored in memory, and wherein the results of the comparison are subsequently retrieved.

14. The system of claim 10, wherein the user profiles include one or more languages spoken, and wherein the overlap pertains to a common language spoken by the first user and by the second user.

15. The system of claim 10, wherein the user profiles include age, and wherein the overlap pertains to a common age range in which the first user and the second user fall.

16. The system of claim 10, wherein the user profiles include playing style information, and wherein the overlap pertains to similarities in playing style of the first user and of the second user.

17. The system of claim 10, wherein the user profiles include skill sets, and wherein the overlap pertains to a common skill exhibited by the first user and by the second user.

18. The system of claim 10, wherein the processor further matches the first user to a plurality of users for a multiplayer game title.

19. A non-transitory computer-readable storage medium, having embodied thereon a program executable by a processor to perform a method for matching user profiles in a gaming network, the method comprising:

collecting data about each user that plays in the gaming network, wherein the collected data includes in-game data collected from a plurality of different games;

generating a user profile for each user based on the collected data, wherein the generated user profile includes one or more common variables, and wherein the one or more common variables are obtained from processing the in-game data collected from the plurality of different games played by the user within the gaming network;

storing the generated user profiles for each user in memory;

receiving a compatibility request from a user device of a first user sent in real-time over a communication network, wherein the compatibility request concerns compatibility with one or more other players with respect to at least one specified variable;

matching a first user to a second user by:

comparing the user profile of the first user with the user profiles of a plurality of other users in the gaming network, wherein each comparison outputs a corresponding compatibility score that is based on a degree of overlap with respect to the at least one specified variable, and wherein the customized compatibility request incorporates weights to the outputted compatibility scores, and identifying that the first user is compatible with the second user based on the comparison of user profiles when the outputted compatibility score between the first user and the second user meets a pre-determined threshold; and sending a notification over the communication network to the first user, wherein the notification is displayed at the user device of the first user and includes a marking that indicates a level of compatibility between the first user and the second user based on the compatibility score between the first user and the second user, wherein a different marking is used to indicate a different level of compatibility, and wherein detailed information regarding the matching is displayed for the user to view upon user interaction with the notification.

20. The method of claim 1, further comprising generating a list that includes a level of compatibility between the user and each of the plurality of other users that meets a pre-determined threshold in the gaming network, wherein the generated list is ranked, and wherein the generated list includes a feature whereby the user can invite one or more other users to participate in a game currently being played.

* * * * *